(12) United States Patent
Mou et al.

(10) Patent No.: US 8,733,179 B2
(45) Date of Patent: May 27, 2014

(54) FLOW METER WITH DIGITAL TEMPERATURE COMPENSATION

(75) Inventors: Changhua Mou, Beijing (CN); Di Zhao, Beijing (CN)

(73) Assignee: Beijing Sevenstar Electronics Co., Ltd., Beijing (CN)

( * ) Notice: Subject to any disclaimer, the term of this patent is extended or adjusted under 35 U.S.C. 154(b) by 148 days.

(21) Appl. No.: 13/516,581

(22) PCT Filed: Dec. 16, 2009

(86) PCT No.: PCT/CN2009/001469
§ 371 (c)(1),
(2), (4) Date: Sep. 4, 2012

(87) PCT Pub. No.: WO2011/072420
PCT Pub. Date: Jun. 23, 2011

(65) Prior Publication Data
US 2012/0325012 A1    Dec. 27, 2012

(51) Int. Cl.
*G01F 1/86* (2006.01)
(52) U.S. Cl.
USPC ....................................... 73/861.01
(58) Field of Classification Search
USPC ........................... 73/861.01, 861.02
See application file for complete search history.

(56) References Cited

U.S. PATENT DOCUMENTS

| 4,686,856 A | 8/1987 | Vvra |
| 6,563,385 B2 | 5/2003 | Wojslaw et al. |
| 8,424,392 B2 * | 4/2013 | Kroemer et al. ........... 73/861.18 |
| 2011/0079090 A1 * | 4/2011 | Kroemer et al. ........... 73/861.25 |

FOREIGN PATENT DOCUMENTS

| CN | 101430216 A | 5/2009 |
| JP | 2003121230 A | 4/2003 |

OTHER PUBLICATIONS

International Search Report of PCT/CN2009/001469 dated Sep. 2, 2010.

\* cited by examiner

*Primary Examiner* — Jewel V Thompson
(74) *Attorney, Agent, or Firm* — Amster, Rothstein & Ebenstein LLP

(57) ABSTRACT

A flow meter is disclosed, which composes an operational amplifier, a digital potentiometer, a sensor coil, and fixed resistors $R_1$, $R_2$ and $R_3$. One end of the coil is connected to the non-inverting input terminal of the amplifier, the other end is grounded. The $R_1$ is connected between the non-inverting input terminal and the output terminal of the amplifier, the inverting input terminal of the amplifier is connected to one end of $R_2$ and $R_3$, the other end of $R_2$ is connected to the output terminal of the amplifier, and the other end of $R_3$ is grounded. The connecting end of $R_2$ and the output terminal of the amplifier is connected to the high side of the potentiometer, the grounded end of $R_3$ is connected to the low side of the potentiometer, and the inverting input terminal of the amplifier is also connected to the sliding end of the potentiometer.

4 Claims, 1 Drawing Sheet

FLOW METER WITH DIGITAL TEMPERATURE COMPENSATION

FIELD OF THE INVENTION

The present invention relates generally to a flow meter, more particularly to a flow meter with digital temperature compensation.

BACKGROUND OF THE INVENTION

Flow measurement and control are an important means in the field of industry. A flow meter can be any of an assortment of devices meant to measure the speed of a mass as it passes through a closed space. A thermal flow meter is one kinds of the thermal flow meter. As a mass moves through a closed space, the thermal flow meter having sensors detects the flow rate by measuring the heat transferred from the surface of the sensors to the flowing mass. The sensor comprises a Wheatstone bridge having a upstream sensor coil $R_{coil11}$, a downstream sensor coil $R_{coil12}$, a resistor $R_{11}$ and a resistor $R_{22}$ usually, as shown in FIG. 1. Both the upstream sensor coil $R_{coil11}$ and the downstream sensor coil $R_{coil12}$ are heating elements. When the flowing mass passes by the upstream sensor coil $R_{coil11}$ and the downstream sensor coil $R_{coil12}$, the surface temperature of the upstream sensor coil $R_{coil11}$ and the downstream sensor coil $R_{coil12}$ change accordingly, this results in the change of their resistances which are reflected by their voltages. Then the flow rate of the mass can be obtained by measuring the voltage values.

However, the upstream sensor coil $R_{coil11}$ and the downstream sensor coil Rcoil12 are unbalanced because of the manufacturing error in most cases. When the temperature changed, the temperature drift caused by the unbalance may be occurred. Generally, the degree of the sensor affected by temperature is determined by the quality of the sensor.

Among most products of the thermal sensors in the prior art, there is not a method is offered to compensate the temperature drift but to lower the tolerance and raise the precision of components. In this way, the ordinary effect is obtained together with huge waste. Moreover, the thermal sensors in the prior art generally work in the driving mode of constant current, and the sensors tend to be affected by temperature and environment, which brings about a larger null shift and a poor precision for products.

SUMMARY OF THE INVENTION

The present invention aims to solve the problem of the flow meter in the prior art, by providing an improved flow meter with digital temperature compensation, which works in a mode of constant temperature replacing the driving mode of constant current. The flow meter has high precision and good stability, and regulates itself on the bias of the temperature, which overcomes the deficiency of the prior art.

The present invention attains the above objective by providing a flow meter with digital temperature compensation, whose circuit is composed of an operational amplifier A, a digital potentiometer $R_W$, a sensor coil $R_{coil}$ and fixed resistors $R_1$, $R_2$ and $R_3$; one end of the sensor coil $R_{coil}$ is connected to the non-inverting input terminal of the operational amplifier A, the other end is grounded, the fixed resistor $R_1$ is connected between the non-inverting input terminal and the output terminal of operational amplifier A, the inverting input terminal of the operational amplifier A is connected to one end of the fixed resistors $R_2$ and one end of fixed resistor $R_3$, the other end of the fixed resistors $R_2$ is connected to the output terminal of the operational amplifier A, and the other end of the fixed resistor $R_3$ is grounded, the connecting end of the fixed resistor $R_2$ and the output terminal and the inverting input terminal of the operational amplifier A are all connected with the high-side terminal of the digital potentiometer $R_W$, the grounded end of the fixed resistor $R_3$ is connected with the low-side terminal of the digital potentiometer $R_W$, the inverting input terminal of the operational amplifier A is connected with the sliding end of the digital potentiometer $R_W$.

According to the concept of the present invention, a fixed resistor $R_4$ is connected between the connecting end of the fixed resistor $R_2$ and the output terminal of the operational amplifier A and the high-side terminal of the digital potentiometer $R_W$.

According to the concept of the present invention, a fixed resistor $R_5$ is connected between the grounded end of the fixed resistor $R_3$ and the low-side terminal of the digital potentiometer $R_W$.

According to the concept of the present invention, a fixed resistor R6 is connected between the inverting terminal of the operational amplifier A and the sliding end of the digital potentiometer $R_W$.

The flow meter with digital temperature compensation of the present invention works in a constant temperature mode, replacing the constant current mode, and the sensor thereof works under a stable environment. And the flow meter has high measurement accuracy and good stability. Besides, the function of automatic temperature adjustment is introduced, which can compensate for measurement error of the sensor caused in production on the basis of the temperature value, so the temperature coefficient of the sensor can be doubled and even more, compared with those of the existing products.

BRIEF DESCRIPTION OF THE DRAWINGS

The accompanying drawings are not intended to be drawn to scale. In the drawings, each identical or nearly identical component that is illustrated in various figures is represented by a like numeral. Fur purposes of clarity, not every component may be labeled in every drawing. In the drawings.

DETAILED DESCRIPTION OF THE EMBODIMENTS

Some exemplary embodiments explaining the features and advantages of the present invention will be stated in detail in the following description. It is to be understood that different embodiments of the present invention have a variety of variations, which will fall within the scope of the present invention, and the description and figure showing are essentially used to explain the present invention, but not to limit the present invention.

Figure 1:
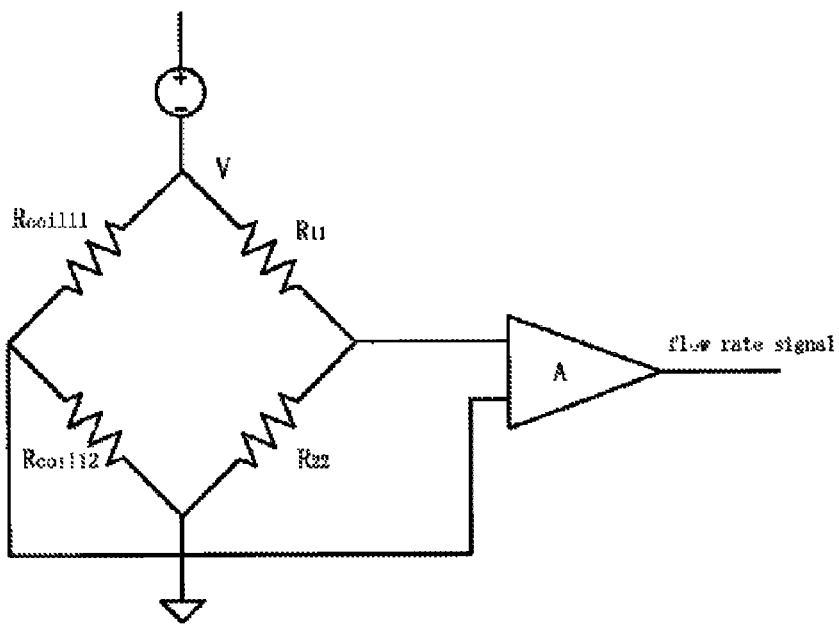
FIG. 1 shows a circuit schematic diagram of a flow meter in the prior art
Figure 2:
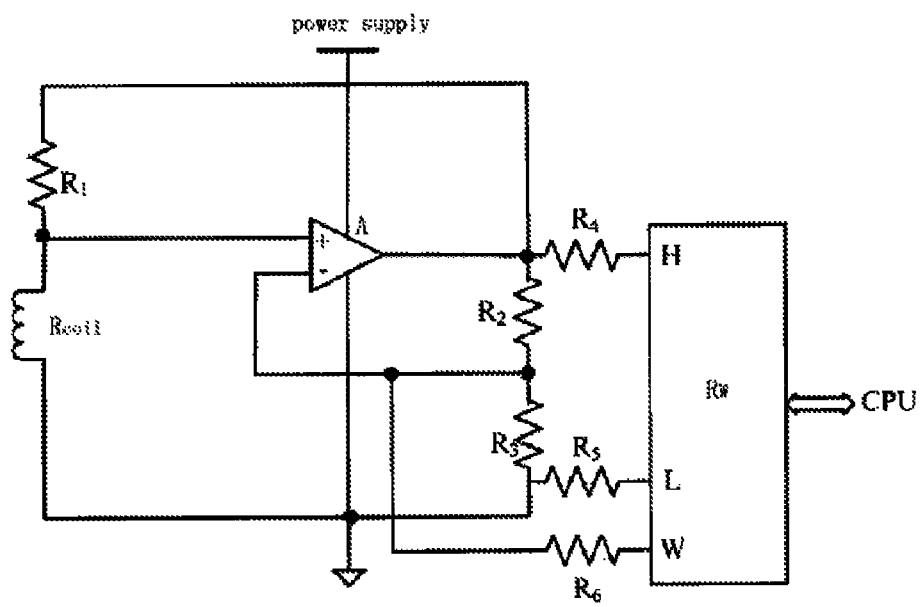
FIG. 2 shows a circuit schematic diagram of a flow meter with digital temperature compensation according to one embodiment of the present invention

The flow meter with digital temperature compensation of the present invention is illustrated here in accordance with the drawings and the embodiments. As shown in FIG. 2, the flow meter with digital temperature compensation of the present invention comprises an operational amplifier A, a digital potentiometer $R_W$, a sensor coil $R_{coil}$, and several fixed resistors.

In the embodiment, the connection relationship between them is as follows: One end of the sensor coil $R_{coil}$ is connected to the non-inverting input terminal of the operational amplifier A, the other end is grounded. A fixed resistor $R_1$ is connected between the non-inverting input terminal and the output terminal of operational amplifier A, the inverting input terminal of the operational amplifier A is connected to one end of the fixed resistor $R_2$ and one end of the fixed resistor $R_3$, the other end of the fixed resistors $R_2$ is connected to the output terminal of the operational amplifier A, and the other end of the fixed resistor $R_3$ is grounded. The connecting end of the fixed resistor $R_2$ and the output terminal of the operational amplifier A is connected with the high-side terminal H of the digital potentiometer $R_w$. The grounded end of the fixed resistor $R_3$ is connected with the low-side terminal L of the digital potentiometer $R_w$. The inverting input terminal of the operational amplifier A is connected with the sliding end W of the digital potentiometer $R_w$.

In some embodiments, a fixed resistor $R_4$ may be connected between the connecting end of the fixed resistor $R_2$ and the output terminal of the operational amplifier A and the high-side terminal H of the digital potentiometer $R_W$. A fixed resistor $R_5$ may be connected between the grounded end of the fixed resistor $R_3$ and the low-side terminal L of the digital potentiometer $R_W$. A fixed resistor $R_6$ may be connected between the inverting input terminal of the operational amplifier A and the sliding end W of the digital potentiometer $R_W$. The digital potentiometer $R_W$ is coupled with a controlling CPU and changed its resistance on the basis of the control instruction from the controlling CPU.

Based on features of the operational amplifier A, the potential of the inverting input terminal of the operational amplifier A equals to that of the non-inverting input terminal. The temperature of the sensor coil $R_{coil}$ increases when current flows through the sensor coil $R_{coil}$. From the formula $R_{coil,T} = R_{coil,0}(1 \pm \alpha T)$, you can see, the resistance of the sensor coil $R_{coil}$ increases with the rise of the temperature. In the formula, $R_{coil,T}$ is the resistance of the sensor coil $R_{coil}$ at T degree centigrade, and $R_{coil,0}$ is the resistance of the sensor coil $R_{coil}$ at 0° C. The resistor $R_1$, $R_2$ and $R_3$ are all fixed resistors. The potential of the inverting input terminal of the operational amplifier A equals to that of the non-inverting input terminal until the following formula is met:

$$\frac{R_1}{R_{coil}} = \frac{R_2}{R_3}.$$

In this way, the resistance of the sensor coil $R_{coil}$ remains constant under any circumstances. As a result, the resistance of the sensor coil $R_{coil}$ will not be affected by the environment and temperature, and the flow meter has little zero draft and high measurement accuracy.

It is particularly worth mentioning that, the controlling CPU generates an instruction to adjust and change the resistance of the digital potentiometer $R_W$ in real time according to the temperature value, so that ratio of the resistance of $R_2$ to that of $R_3$ is adjusted and the resistance of the sensor coil $R_{coil}$ is changed accordingly. Then the influence of manufacturing error is compensated, and the temperature coefficient of the sensor coil $R_{coil}$ is raised. With a stable zero point, the flow meter is suitable for the occasion that temperature changes rapidly.

To sum up, the flow meter with digital temperature compensation of the present invention improves the measurement accuracy of the thermal flow meter. It has a stable zero point and is suitable for the occasion that temperature changes rapidly. Furthermore, the temperature coefficient of the sensor reaches more than 0.02% FS/° C., being twice that of the existing products.

The foregoing embodiments only relate to preferred embodiments of the present invention. The skilled in the art would recognize that these embodiments are by no means intended to limit the scope of patent protection the present invention, and that all of the structural equivalents in light of the description and accompanying drawings should fall within the scope of the present invention.

What is claimed is:

1. A flow meter with digital temperature compensation, comprising:
   an operational amplifier A,
   a digital potentiometer $R_W$,
   a sensor coil $R_{coil}$, and
   fixed resistors $R_1$, $R_2$ and $R_3$;
   wherein:
   one end of the sensor coil $R_{coil}$ is connected to the non-inverting input terminal of the operational amplifier A, the other end is grounded, the fixed resistor $R_1$, is connected between the non-inverting input terminal and the output terminal of operational amplifier A, the inverting input terminal of the operational amplifier A is connected to one end of the fixed resistors $R_2$ and one end of fixed resistor $R_3$, the other end of the fixed resistors $R_2$ is connected to the output terminal of the operational amplifier A, and the other end of the fixed resistor $R_3$ is grounded, the connecting end of the fixed resistor $R_2$ and the output terminal of the operational amplifier A is connected with the high-side terminal of the digital potentiometer $R_W$, the grounded end of the fixed resistor $R_3$ is connected with the low-side terminal of the digital potentiometer $R_W$, and the inverting input terminal of the operational amplifier A is connected with the sliding end of the digital potentiometer $R_w$.

2. The flow meter with digital temperature compensation as claimed in claim 1, further comprising a fixed resistor $R_4$, wherein the fixed resistor $R_4$ is connected between the connecting end of the fixed resistor $R_2$ and the output terminal of the operational amplifier A and the high-side terminal of the digital potentiometer $R_W$.

3. The flow meter with digital temperature compensation as claimed in claim 1, further comprising a fixed resistor $R_5$, wherein the fixed resistor $R_5$ is connected between the grounded end of the fixed resistor $R_3$ and the low-side terminal of the digital potentiometer $R_W$.

4. The flow meter with digital temperature compensation as claimed in claim 1, further comprising a fixed resistor $R_6$, wherein the fixed resistor $R_6$ is connected between the inverting terminal of the operational amplifier A and the sliding end of the digital potentiometer $R_w$.

* * * * *